United States Patent
Burgstahler et al.

(10) Patent No.: US 7,139,634 B2
(45) Date of Patent: Nov. 21, 2006

(54) DEVICE AND METHOD FOR CONTROLLING A GLASS FORMING MACHINE

(75) Inventors: Ralph Burgstahler, Kandel (DE); Roland Schultheiss, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/780,543

(22) Filed: Feb. 17, 2004

(65) Prior Publication Data

US 2005/0107907 A1    May 19, 2005

Related U.S. Application Data

(63) Continuation of application No. PCT/DE02/03016, filed on Aug. 14, 2002.

(30) Foreign Application Priority Data

Aug. 14, 2001   (DE)   ................ 101 39 808

(51) Int. Cl.
*G06F 15/46*   (2006.01)
(52) U.S. Cl. ............ 700/157; 700/158; 700/169
(58) Field of Classification Search ........ 700/157, 700/158, 169
See application file for complete search history.

(56) References Cited

U.S. PATENT DOCUMENTS

| | | | |
|---|---|---|---|
| 5,247,450 A * | 9/1993 | Clark | 700/158 |
| 5,271,756 A | 12/1993 | Peterson et al. | |
| 5,812,392 A | 9/1998 | Dutto et al. | |
| 6,604,383 B1 * | 8/2003 | Simon | 65/158 |
| 6,848,271 B1 * | 2/2005 | Auras et al. | 65/29.11 |
| 2002/0035409 A1 * | 3/2002 | Lingua et al. | 700/157 |
| 2002/0095229 A1 * | 7/2002 | Lingua et al. | 700/95 |
| 2004/0193304 A1 * | 9/2004 | Hartmann et al. | 700/157 |

FOREIGN PATENT DOCUMENTS

| | | |
|---|---|---|
| DE | 195 23 941 C1 | 1/1997 |
| EP | 0 668 248 A | 8/1995 |
| EP | 0 873 975 A | 10/1998 |
| EP | 0 879 795 A | 11/1998 |
| JP | 08-377425 A | 12/1996 |

* cited by examiner

*Primary Examiner*—Albert W. Paladini
*Assistant Examiner*—Michael D. Masinick
(74) *Attorney, Agent, or Firm*—Henry M. Feiereisen

(57) ABSTRACT

A method and device for regulating and/or controlling a glass forming machine is described. A central controller transmits parameterization data and/or synchronization data and/or motion information and/or motion path information using at least one integrated bus system. The central controller also permits centralized management of the cams of the glass forming machine.

12 Claims, 2 Drawing Sheets

DEVICE AND METHOD FOR CONTROLLING A GLASS FORMING MACHINE

CROSS-REFERENCES TO RELATED APPLICATIONS

This application is a continuation of prior filed copending PCT International application no. PCT/DE02/03016, filed Aug. 14, 2002, which was not published in English and which designated the United States and on which priority is claimed under 35 U.S.C. §120, the disclosure of which is hereby incorporated by reference.

This application claims the priority of German Patent Application, Serial No. 101 39 808.5, filed Aug. 14, 2001, pursuant to 35 U.S.C. 119(a)–(d), the disclosure of which is incorporated herein by reference.

BACKGROUND OF THE INVENTION

The present invention relates, in general, to a device and a method for controlling a glass forming machine.

A glass for machine can be used to automatically form glass containers during glass fabrication. One type of glass forming machine is referred to as Individual Section Machine (IS-Machine). An exemplary machine of this type includes, for example, the following sections:

a globule feeder with a plunger, a shear, a globule distributor, and individual sections for forming the glass.

The globule feeder and/or the shear can also be associated with a feed unit for the IS-machine.

A controller is employed to control the shear and/or the synchronization with the globule feeder or the globule distributor. The sections of the IS machine are controlled by a controller that is separate from the feed unit. The control of a conventional IS machine includes various control components, with each component typically including at least one processor for the corresponding control functions. In addition, each sector can be associated with one processor. The control functionality has to be able to manage a complex program flow with complex timing of all components of the IS machine. To manage the complex program flow, a plurality of interconnected computer units having, for example, individual processors and linked by a clock signal are conventionally used. The clock signal, i.e., the clock pulses, are typically generated by the globule feeder. The clock signal is transmitted to the controller(s) of the sections as a binary machine clock signal, for example, in the form of a voltage edge that either rises or falls, e.g., from 0 V to 24 V, or from 0 V to 12 V, or vice versa.

Accordingly, in conventional machines, complex and expensive special multi-processor solutions are required for controlling a cam control device of the complexity found in a glass forming machine. Each section has its own cam functionality. The special multi-processor solutions for controlling an IS glass forming machine, in the following referred to simply as glass forming machine, typically include a main processor and several autonomous dedicated processors, with one processor for each section, which are synchronized across the entire machine by a binary clock signal which is generated by the feed unit, i.e. in particular by the globule feeder (with plunger), employing one pulse per step. In addition to the connection for transmission of clock data, additional bus connections exist for parameterization, parameter exchange and transmission of additional data.

Such special multiprocessor solution represents a complex solution requiring an external binary bit that ensures a rapid reaction to the clock pulse of the plunger for executing cam functions of the sections, or for starting the cam for a pulse of virtual 360°, as is the case here with an electronic cam.

It would therefore be desirable and advantageous to provide an improved method and device for simplifying the operation and/or configuration of glass forming machines, which obviates prior art shortcomings and is able to specifically employ a central controller for synchronizing the operation of the various machine sections.

SUMMARY OF THE INVENTION

According to one aspect of the invention, a method for controlling a glass forming machine is described wherein the glass forming machine includes a plurality of processing units. The method includes the steps of providing at least one integrated bus system, and providing a central controller, wherein the central controller and the plurality of processing units are connected to the integrated bus system. The central controller transmits parameterization data and/or synchronization data and/or motion information and/or motion path information via the at least one integrated bus system. In one embodiment, the glass forming machine also includes a plurality of cams, wherein the central controller centrally manages the plurality of cams.

According to another aspect of the invention, a method for controlling a glass forming machine which has a plurality of processing units and a plurality of cams, includes the steps of providing an integrated bus system, and providing a central controller, wherein the central controller centrally manages the plurality of cams. In one embodiment, the central controller transmits at least one of parameterization data, synchronization data, motion information and motion path information via the at least one integrated bus system.

According to yet another aspect of the invention, a device for controlling a glass forming machine includes at least one integrated bus system, a plurality of processing units connected to the bus system, and a central controller connected to the integrated bus system and transmitting at least one of parameterization data, synchronization data, motion information and motion path information via the at least one integrated bus system. In one embodiment, the glass forming machine further comprises a plurality of cams, and wherein the central controller centrally manages the plurality of cams.

According to still another aspect of the invention, a device for controlling a glass forming machine with a plurality of cams includes at least one integrated bus system, and a central controller connected to the integrated bus system, wherein the central controller centrally managing the plurality of cams. In one embodiment, the central controller transmits at least one of parameterization data, synchronization data, motion information and motion path information via the at least one integrated bus system.

With the method of the invention for controlling a glass forming machine, the glass forming machine has different sections. These sections include processing units, with one section being provided for the formation of at least one glass globule. The processing units are devices for carrying out the glass formation, whereby the various functions of the processing units can be started by way of a cam functionality. Each section has individual cam functions, whereby the cam functions of identical sections can also be implemented identically. A processing unit is, for example, a pneumatic or electrical device for closing and/or opening a mold designed to form the glass.

By using a central controller for the glass forming machine implemented as an Individual Section (IS) machine, parameterization data and/or synchronization data and/or motion information and/or motion path data can be transmitted via at least one integrated bus system. The simplification reduces complexity and cost. The bus system is preferably a serial bus. An exemplary serial bus is the Profibus or a bus based on Ethernet protocol. Serial bus systems are inexpensive, have a simple construction and are relatively immune to failure. The term integrated bus system is used to indicate a bus system that is of the same type throughout. This approach also simplifies the operation of the glass forming machine.

By using a central controller for the glass forming machine, a central cam control can be implemented. With the central cam control, all or at least several cam functions, which are executed sequentially or simultaneously in a time-critical fashion, are performed with significantly less jitter, i.e. experience much smaller time delays, as compared to conventional methods. This is advantageously accomplished by using an interpolated clock pulse of the system for controlling to the glass forming machine.

By employing a central controller, machines, such as metal stamps for impressing a cavity in a glass globule, pivoting arms for moving to be formed glass or other devices of a section with each other can be precisely coordinated, which can also increase the processing speed at which the glass forming machine produces finished glass. Employing a central bus system also simplifies the configuration of the data connections between the different sections and/or equipment of the glass forming machine.

The central controller of all the glass forming machine, for example an Individual Section glass forming machine, abbreviated as IS machine, advantageously includes correct timing of all processing units through start and stop commands. Start and stop commands are herein examples for cam functions. Timing control includes, among others, the correct control of the processing units, such as the globule distributor, the conveyor belts, the pushers, the opening and closing devices for glass forming molds, etc. The start and stop commands are centrally displayed, for example in the form of a large cam control system with, e.g., over 1200 cams for an IS machine that has, for example, more than ten sections. For example, during one rotation of the machine, i.e., during an imaginary cam rotation of 360°, 1200 cams are addressed within approximately 2.4 seconds. The term imaginary cam rotation is used because the cam is implemented in the software of the controller.

According to another advantageous feature of the invention, certain cams of the cam system can also be prioritized. In other words, certain cams of the sections can be transmitted over the bus system with a higher priority. This guarantees that time-critical cams for important devices are reliably transmitted.

The central controller can control the glass forming machine centrally. This is less expensive than a decentralized configuration of the controller, using different control components with individual processors. Advantageously, two glass forming machines can be controlled by one central controller and via one bus system or at least two bus systems. Accordingly, a second additional controller can be eliminated.

With the central controller, a binary machine clock cycle can also advantageously be eliminated. A binary machine clock cycle, which is implemented for example by a rising edge from 0 V to 24 V, can for example be used as a start command for the shear, which is located downstream of the globule feeder. The signal of the binary machine clock pulse is generated, for example, by the globule feeder via a proximity switch or by a servo control. In one embodiment of the invention, such clock pulse is distributed and provided to the various units via the bus system.

With the method of the invention, as well as with the device for performing the method, the entire machine start and stop time points (cams) can be centrally managed and/or controlled using a central system. With suitable preprocessing and automatic prioritization, the decentralized cam functions can be inputted and outputted, for example, to the drives of the machine components over an integrated bus system, such as the clock-synchronized bus system PRIFIBUS DP.

The bus system in the glass forming machine takes on the following tasks:
 a) transmission of parameterization information
 b) transmission of synchronization information, and
 c) transmission of motion information and motion path data.

The system can, for example, provide the following advantages:
 cost savings through a central solution for the control functions,
 integrated bus system suitable for all data transmission tasks, including synchronization, which obviates the need for external synchronization. An external synchronization in form of a clock pulse can still be employed
 enables uniform project management, parameterization and operational functionality which can be implemented centrally or decentralized
 the system is scalable when using two glass forming machines in tandem. One controller can be used for both glass forming machines or a dedicated controller can be used for each glass forming machine. A central CPU can be associated with each of the respective controllers which can be connected by way of the bus system.

Additional advantages are achieved through:
 a central cam management for the entire glass forming machine
 optional central processing of the cams via the control software (e.g., as a 80×3600 matrix relating to sections and angles (columns correspond to outputs, the rows correspond to, for example, angles in increments of 0.1°), prioritization, etc.)
 replacing machine-specific special solutions, as they are currently implemented in conventional machines, and
 elimination of external wiring for the synchronization signal, i.e., the clock pulses. Synchronization is performed via the integrated bus system.

According to another aspect of the invention, the device for controlling a glass forming machine can be an automation component which includes a control functionality.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
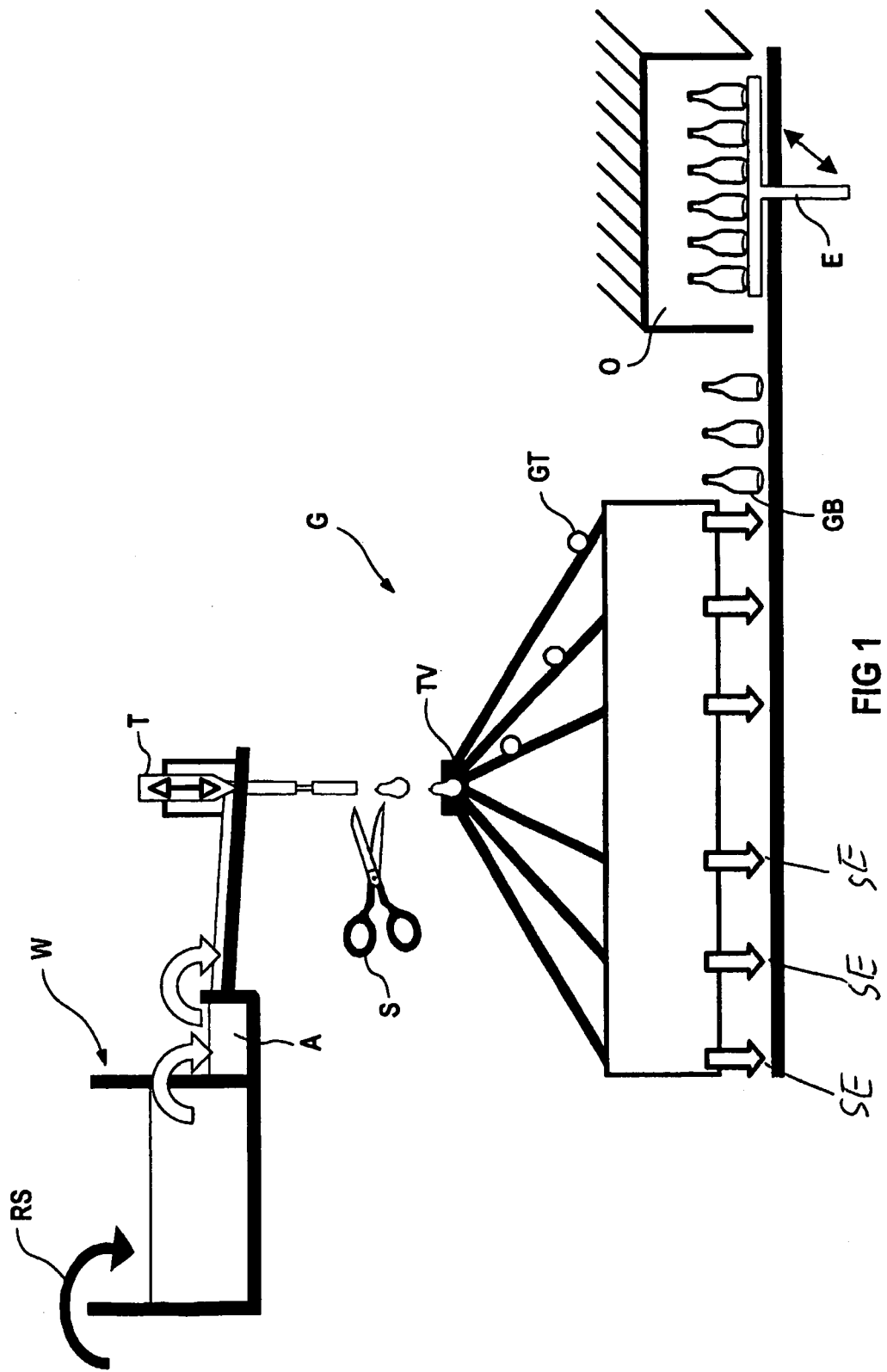
FIG. 1 is a schematic diagram of a glass forming machine.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a glass forming machine G implemented as an Individual Section (IS) machine. The glass forming machine G includes a feed unit with a globule feeder T, a shear S and a globule distributor TV.

The globule feeder T is arranged after the glass tank furnace W into which the raw material RS, i.e., the glass, is supplied, and a working trough A. The liquid glass leaves the working trough A through a heated channel RI. The temperature-controlled channel RI is divided into zones (not shown). The globule feeder T, from which the glass exits through a hole-shaped discharge port AB, is located downstream of the channel RI. The glass outflow is constricted by a periodically immersed plunger ST so as to specify the size of the globules.

The shear S is responsible for cutting the liquid glass strand which reaches the shear S from the globule feeder T with an already necked-down diameter. Interchangeable knives ME with a V-shaped or C-shaped cutting edge neck down the glass strand simultaneously from all sides towards the center, finally severing it completely. This cutting operation has to be performed very quickly, since the contact between the cold knife ME and the hot glass leaves a cutting mark on the finished product that depends on the contact time. Different motion profiles for adjusting the quantity and quality of the cut glass can be stored in a controller. Globule weights in the order of approximately 200 grams are typical for container glass (0.7 liter bottles). The glass container mass is repeatable with an accuracy of ±0.5 grams at a throughput of up to 250 globules per minute.

The globule distributor TV distributes the glass globules GT into the preforms of the different IS-machine sections. One globule distributor can supply approximately 12 IS-sections with up to 250 glass cuts per minute (cuts/min). A "cut" can here represent, for example, a single globule, or twin, triple or quadruple globules.

The globule distributor TV feeds the liquid glass globules into the preforms of the IS-machine. Each section is independent (individual), from which the name Individual Sections glass forming machine originates, and is serviced individually from the globule distributor TV. Depending on the configuration, a section SE can be supplied simultaneously with up to four globules.

Preforming is typically accomplished by using a metal stamp which presses the glass into the preforms and forms a hole in the center (press-and-blow process). A pivotable arm subsequently moves the preformed spherical glass bulb into the finished mold, where the bulb is blown into the shape of the final container, for example a bottle GB, by using compressed air. The preparation of the preform and the intermediate steps performed before forming the bottle are not shown in FIG. 2.

After the finished mold is opened, a gripper pushes the red-hot bottle GB onto a longitudinal conveyer belt LAE. The bottles can optionally also be diverted onto a transverse belt (not shown), before being pushed in groups by a pusher device E into an annealing unit O (cooling furnace).

Figure 2:
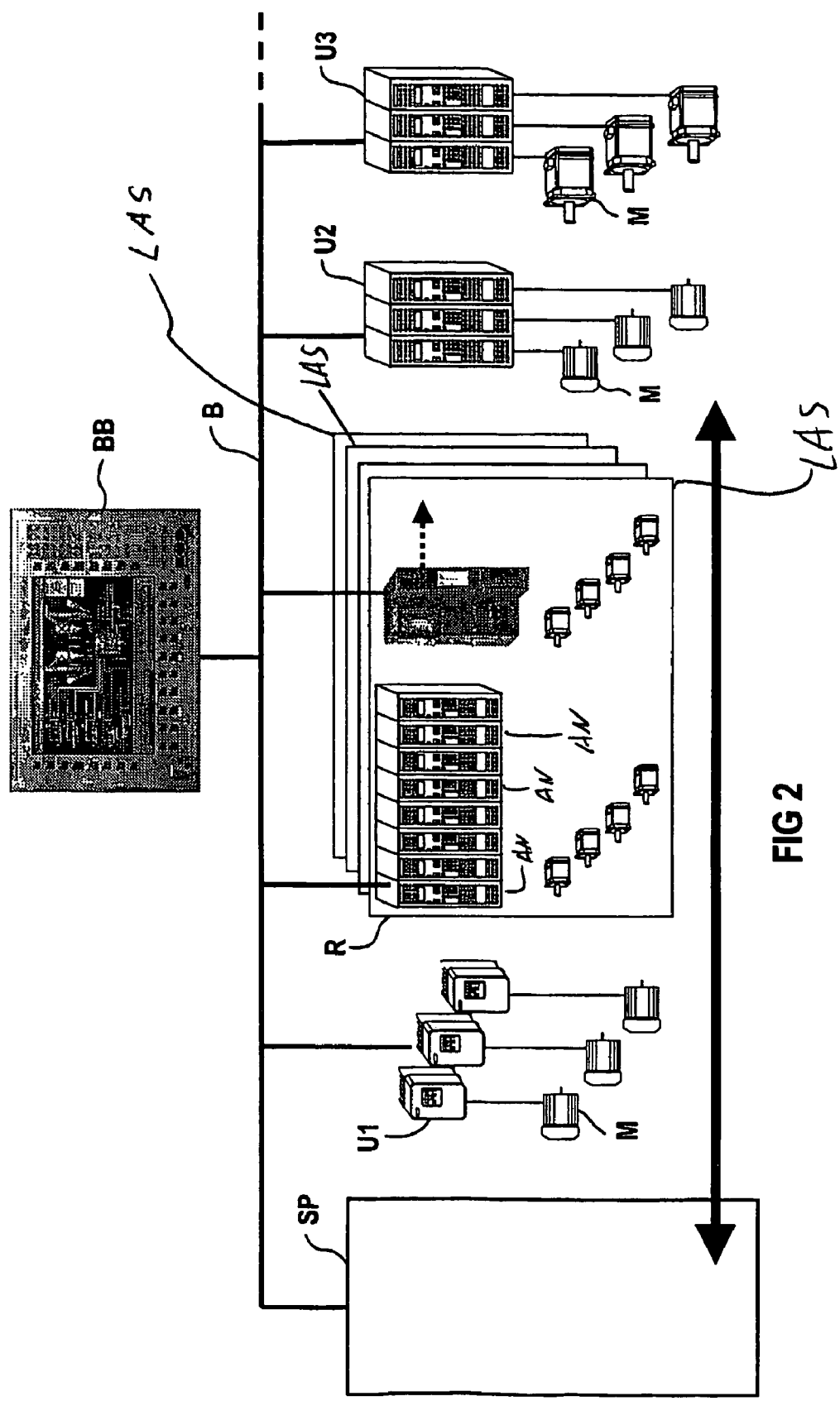
FIG. 2 is a schematic diagram of an integrated bus system with a central controller.

FIG. 2 shows a device for controlling the glass forming machine. An observation and operating unit BB is connected via a bus system with converters U1, U2, controllers R and a feed unit SP. The converters U1, U2 power the electric motors M. The motors are part of the feed unit SP, as indicated by the double arrow.

In FIG. 2, the central controller R is integrated with one or several drives. The cam control system is executed on the central controller R. The computed cams are transmitted via a Profibus DP to the inputs and outputs as well as the drives of the various sections. The depicted configuration for each section is implemented in each machine, for example, ten to twelve times.

The converters U1 to U3 control the motors M, in particular their rotation speed. The central controller R controls the converters U1 to U3 via the integrated bus system B. Parameterization data and/or synchronization data and/or motion information and/or motion path data can be transmitted via a control and observation unit BB. The converters U1 to U3 can be implemented by using, for example, Micro-masters and Master Drives commercially available from the company SIEMENS.

The controller R can take on, for example, the following functions of the glass forming machine G:
rotation speed control
rapid motion/slow motion
moving to a limit stop
positioning
synchronization of rotation speed and angles
electric gear function
radial cam
complex, comprehensive and central cam management.

The motors M can be implemented, for example, as conventional asynchronous motors and as servo machines. The motors can control the following components of the glass forming machine G:
tube rotation
adjusting the height of the rotating tube
blower
longitudinal belt
deflection corner
transverse belt
pusher X, pusher Y, pusher Z In FIG. 2, the sections are represented by tabs LAS.

As shown in FIG. 2, the functionality of the central controller for the various sections can also be applied to one or several drives units AN of a section. In this way, other sections can be centrally controlled from a single section.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for controlling a glass forming machine, said glass forming machine comprising a plurality of glass processing units, the method comprising the steps of:
   providing at least one integrated serial bus system;
   providing a central controller integrated with one or more of the glass processing units, said central controller and the plurality of glass processing units connected via the integrated serial bus system; and
   the central controller transmitting at least one of parameterization data and synchronization data via the at least one integrated serial bus system to others of the glass processing units.

2. The method according to claim 1, wherein the glass forming machine further comprises a plurality of cams, and the central controller centrally controls the plurality of cams in a time-synchronized fashion.

3. The method according to claim 2, wherein certain cams of the plurality of cams are prioritized.

4. The method of claim 1, wherein the central controller transmits information about motion and/or motion path via the at least one integrated serial bus system.

5. A method for controlling a glass forming machine, said glass forming machine comprising a plurality of glass processing units and a plurality of cams, the method comprising the steps of:
   providing an integrated serial bus system;
   providing a plurality of drives operating the cams;
   providing a central controller integrated with one or more of the drives, wherein the central controller provides synchronization and parameterization signals via the integrated serial bus system for centrally controlling the plurality of cams.

6. The method according to claim 5, wherein certain cams of the plurality of cams are prioritized.

7. A device for controlling a glass forming machine, comprising:
   at least one integrated serial bus system;
   a plurality of glass processing units connected to the integrated serial bus system and to drives of the glass forming machine; and
   a central controller integrated with one or more of the drives and connected to the integrated serial bus system and transmitting at least one of parameterization data and synchronization data via the at least one integrated serial bus system.

8. The device of claim 7, wherein the glass forming machine further comprises a plurality of cams, and wherein the central controller centrally controls the plurality of cams in a time-synchronized fashion.

9. The device according to claim 7, wherein the device is an automation component which includes a control functionality.

10. The device of claim 7, wherein the central controller transmits information about motion and/or motion path via the at least one integrated serial bus system.

11. A device for controlling a glass forming machine with a plurality of cams, comprising:
    drives operating the cams,
    at least one integrated serial bus system, and
    a central controller integrated with one or more of the drives and connected to the integrated serial bus system, said central controller providing synchronization and parameterization signals via the integrated serial bus system for centrally controlling the plurality of cams.

12. The device according to claim 11, wherein the device is an automation component which includes a control functionality.

* * * * *